United States Patent [19]
Prasad et al.

[11] 4,396,961
[45] Aug. 2, 1983

[54] VIDEO RECORDER CONTROLLER APPARATUS AND METHOD

[76] Inventors: D. K. Guru Prasad, 23709 Vine, Torrance, Calif. 90501; James D. Croasmun, 1821 E. 1st St., Long Beach, Calif. 90802

[21] Appl. No.: 271,509

[22] Filed: Jun. 8, 1981

[51] Int. Cl.³ ............................................. G11B 21/08
[52] U.S. Cl. ...................................... 360/78; 360/33.1
[58] Field of Search ...................... 360/33.1, 9.1, 11.1, 360/35.1, 75, 78, 10.1, 106, 69; 358/335, 342; 369/215, 219, 221

[56] References Cited
U.S. PATENT DOCUMENTS

| | | | |
|---|---|---|---|
| 4,001,881 | 1/1977 | Folsom | 360/35.1 |
| 4,015,289 | 3/1977 | Kinjo | 360/33.1 |
| 4,151,567 | 4/1979 | Dorsemogen | 360/75 |
| 4,160,266 | 5/1978 | Kurihara | 358/111 |
| 4,314,291 | 2/1982 | Oda | 360/78 |

Primary Examiner—Alan Faber
Attorney, Agent, or Firm—Lewis Anten

[57] ABSTRACT

A video recorder for electronic radiography has timing circuits for anticipating an upcoming change in track thereby minimizing the tearing of a single image frame.

8 Claims, 2 Drawing Figures

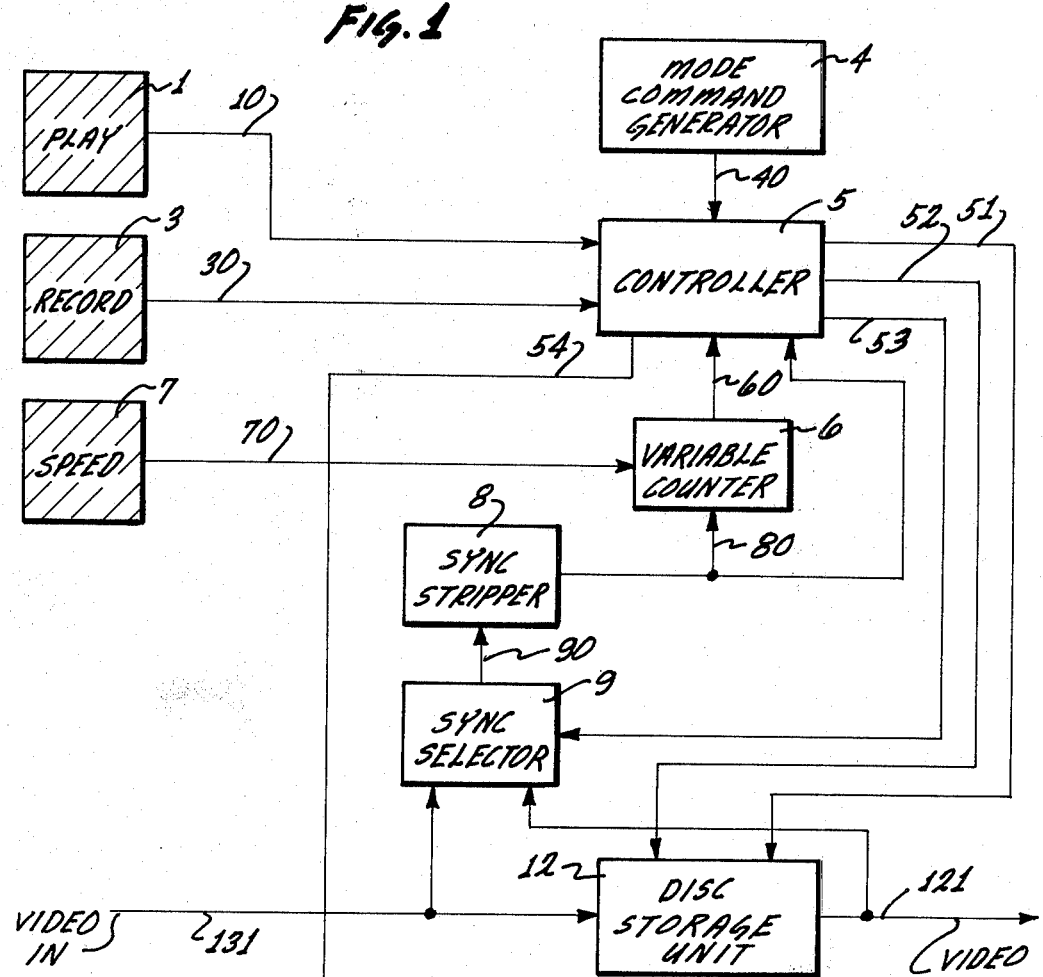

VIDEO RECORDER CONTROLLER APPARATUS AND METHOD

BACKGROUND OF THE INVENTION

1. Field of the Invention

This invention relates to controllers for video recorders. In particular, this invention relates to methods and apparatuses which control the recording of single fields of video information on separate tracks of a magnetic disc drive storage unit.

2. Description of the Prior Art

The medical profession has for some time used a machine known as a fluoroscope to examine internal structures. In such a machine, X-rays are directed through objects or parts onto a fluorescent screen. The result is the appearance of shadows of the objects or parts on the fluorescent screen. Although of tremendous diagnostic value, prolonged exposure to X-rays is now known to be highly undesirable.

One known technique of retaining the benefits of fluoroscopy while minimizing X-ray exposure is to momentarily pulse the X-ray generator and then to photograph the resulting momentary image. While X-ray films have been widely used for this purpose, a more flexible and useful technique is to use an image intensifier in place of the fluoroscope screen and to photograph the momentary image formed on the image intensifier with an electronic television camera connected to a video recorder. This process is known as electronic radiography.

Although inexpensive, magnetic tape video recorders are poorly suited for this application. Not only is it difficult for the operator to locate the single frame of recorded information, but the magnetic tape will not survive the prolonged repeated viewing of the screen single frame which is necessary to produce a still image on the television screen.

One solution to this problem which applicant has employed in the past is to record the single frame of video information in analog form on a single track of a magnetic disc drive. The frame of video information contained on the track of the disc drive is then repeatedly played back onto a TV monitor screen thus recreating the still picture which previously appeared on the fluoroscope screen only momentarily.

Unlike X-ray film, applicant's video recording system can also be used "on line". In this mode, the fluoroscope is pulsed at a rapid rate while the video recorder is synchronized to update the picture viewed on the video monitor with the last picture displayed on the fluoroscope. In this mode, the interior of the X-rayed object can be effectively monitored continuously with only a fraction of the X-ray exposure which an ordinary fluoroscope would otherwise require.

There are many applications, however, where updating is not required very frequently. In such a case, it would be beneficial to provide slower updating speeds so as to further minimize unnecessary x-ray exposure.

To accomplish this result, applicant has in the past utilized a separate delay timer to inhibit updating of the monitor screen (and firing of the fluoroscope) for predetermined intervals of time. Usage of a separate delay timer, however, requires that the delay timer be synchronized to the video frame information to insure that the delay timer will not signal the magnetic disc drive unit to begin recording a new video picture frame at any time other than the beginning of the new video picture frame. However, not only is the expense of such additional circuitry undesirable, but applicant has experienced difficulty in making it work properly.

The need for synchronization also exists when it is desired to sequentially play back a series of separately recorded tracks of recorder video frame information. In order to avoid tearing the picture when the access arm carrying the read-write heads on the disc drive is repositioned over a different track, it is necessary to synchronize the movement of the access arm so that it passes over guard bands separating recorded tracks of video information only during the vertical interval of the video frame. Due to the mechanical delays inherent in moving the access arm, however, to achieve this result it is necessary to commence movement of the access arm from one track to another well before the vertical interval actually begins. To achieve this result, applicant has in the past used a separate single anticipation timer which, upon receiving the appropriate command, causes the access arm to commence movement to a new track a short period of time prior to commencement of the vertical interval.

The amount of anticipatory time required for the anticipation timer is dependent upon the intrinsic mechanical and electrical delays of the system. Although applicant has in the past found it necessary to individually set the amount of anticipatory time for each unit, even with such detailed adjustment, tearing of the monitored picture still occasionally occurs during movement of the access arm. This tearing is highly undesirable because it disrupts the doctor's concentration, and is especially objectionable when the system is changing tracks at a relatively rapid rate.

SUMMARY OF THE INVENTION

It is an object of the present invention to eliminate these and other problems in prior art video recorder controllers.

It is a further object of the present invention to provide a video recorder controller which minimizes tearing of the video picture during track changes.

It is a further object of the present invention to provide a video recorder controller having therein a delay timer for controlling the rate at which video frames of information are played and/or recorded which is inexpensive and which is intrinsically synchronized to the vertical interval.

It is a further object of the present invention to provide a video recorder controller having therein an anticipation timer for insuring that the access arm commences movement towards a new track at precisely the correct moment so as to minimize tearing.

It is a still further object of the present invention to provide a video recorder controller which can be easily and inexpensively modified to operate a video recorder in one or more of a variety of record and/or play back modes.

These and still further objects of the present invention are accomplished by providing a video recorder controller which, itself, is controlled by a replaceable mode command generator.

The update rate of play back and/or recording is controlled by a delay timer which derives its delay time by counting vertical sync pulses. The delay timer includes a counter pre-programmed to count a pre-determined amount of sync pulses before signaling for an update. Delay time, therefore, is directly proportional to the number of vertical sync pulses which the counter is required to count before generating an update command. Because the delay time is derived directly from the vertical sync pulses, it is intrinsically synchronized with the vertical frame information and need not thereafter be resynchronized.

Tearing of the video frame information is minimized by commencing anticipatory movement of the access arm from one track to another in accordance with the following time constraints: A first pre-determined amount of time prior to commencement of the vertical interval when the access arm is moving in a forward direction, and commencing anticipatory movement a second pre-determined amount of time prior to commencement of the vertical interval, different from the first pre-determined amount of time, when the access is to move in the reverse direction. To effectuate this purpose, the anticipatory timer is set to one of two different time intervals depending upon the direction in which the access arm is to be moved.

BRIEF DESCRIPTION OF THE DRAWINGS

FIG. 1 is a block diagram of the present invention connected to a video disc storage unit.

FIG. 2 illustrates a typical wave form of a single frame of video information.

DETAILED DESCRIPTION OF THE PREFERRED EMBODIMENT

FIG. 1 illustrates the present invention connected to a video disc storage unit. The panel controls include play button 1, record button 3, speed control 7, and forward/reverse selector 14. The operation of these panel controls as well as the internal elements of the present invention will now be discussed.

The video pictures being taken by the television camera (not shown) are connected to the system through video input line 131. As shown in FIG. 2, the video signal comprises a series of fields of information such as fields 230 and 231. In a typical interlacing system, a single frame of video picture such as frame 240 is composed of two fields. While the discussion which follows will be in reference to the interlacing system, it is understood that applicant's invention is equally applicable to the non-interlacing systems as well.

The actual video picture information occupies portions 260 and 270 of frame 240. After a complete scan of a video field is made, the scanning mechanism, both in the camera and the playback video monitor, retraces back to the top of the screen to begin a new scan. This retracing operation occurs during the vertical intervals 250 and 255 of frame 240. Vertical sync pulses 210 and 220 are used to enable the recorder and playback monitor to synchronize with the video frame information as later explained.

Referring again to FIG. 1, disc storage unit 12 is designed to record a single frame (or if desired field) of video information on a single track of the magnetic disc. While digital recording techniques are contemplated by the present invention, analog recording of video information is preferred.

Disc storage unit 12 is designed to cause recording of the video input signal (on line 131) on a track of the disc (not shown) upon receipt of a write command signal from write command signal line 52. To insure proper recording of the entire video frame, it is absolutely essential that write command signal line 52 be energized precisely at the commencement of the video frame and deenergized precisely at the termination of the video frame. To effectuate this result, the video input signal is also fed to sync selector 9. Sync selector 9 is an analog switch controlled by playback/record mode line 53. When playback/record mode line 53 signals recording, sync selector 9 will route the video input signal (on line 131) to output line 90. When, on the other hand, playback/record mode line 53 indicates play back, the video output signal appearing on video output line 121 will be routed to output line 90. The reason for this latter routing will later be explained.

Output line 90 is connected to sync stripper 8. Sync stripper 8 is designed in accordance with well-known techniques to remove all information from the video frame signal except its vertical sync pulses and to output these sync pulses on line 80. These vertical sync pulses are then fed to the input of variable counter 6. Variable counter 6 is designed in accordance with well-known techniques to provide a periodic output signal on line 60 for every pre-determined amount of input sync pulses appearing on line 80 which are counted. In the preferred embodiment of applicant's invention, the pre-determined amount is set by speed control 7 which is connected to variable counter 6 through line 70.

Output 60 from variable counter 6 therefore represents a variable time delay, controlled by speed control 7, intrinsically synchronized to the sync pulses of the video frames. This signal is then fed through line 60 to controller 5.

When record button 3 is energized, a signal is sent over line 30 to controller 5. Upon receipt of the next synchronized delay signal over line 60, right command signal 52 is energized thus causing recording of the video frame information to synchronously commence with the beginning of the video frame. Unlike the prior system used by applicant, the update delay time in the present invention is automatically synchronous with the vertical sync pulses since it is derived therefrom. Upon the subsequent receipt of two stripped sync pulses from line 80, controller 5 is designed such that record command signal 52 will then be deenergized thus resulting in a synchronous and complete recording of a single frame of video information. Because of the widespread use of the vertical sync pulse for other timing purposes during playback, applicant has found it desirable to continue recording the video information for 400 $\mu$sec into the next video frame to avoid glitches in the recorded sync pulse.

During recording, disc storage unit 12 is designed to cause the video input signal on line 131 to also appear on the video output line 121. Immediately following recording of the frame, controller 5 will energize play command signal line 51 causing the video frame signal just recorded to be repetitively sent over video output line 121. The result will be that the single frame of video information just recorded will be continuously displayed on the video monitor (not shown) which is connected to video output line 121.

The rate of update, as explained above, is determined by the setting of speed control 7. While there are of course a variety of different types of speed controls which can be used for speed control 7, such as potentiometers or programable switch arrays, it will be recognized that only certain discrete delay times can be obtained from this system. In practice, however, the savings from simplified circuitry and the reliability of a synchronous delay time far outweighs the slight disadvantage of being limited to delay times which are multiples of the separation time between sync pulses.

As explained above, it is also desirable to have the facility to retain in memory a sequence of different frames of video information. For this purpose the read/write head (not shown) in disc storage unit 12 is attached to a movable access arm (not shown) which in turn is controlled by step motor 17 through shaft 171 to enable positioning of the read/write head over a series of different tracks on the magnetic disc. In this mode of operation, after each frame of video information is recorded, the access arm (not shown) must move the read/write head an incremental amount (not shown) to a new track.

To prevent tearing of the video frame, both during recording and playback, it is essential that the read/write head on the access arm pass through the guard band region between tracks during the vertical interval of the video frame. As previously emphasized, it is necessary to accomplish this result to commence movement of the access arm even prior to commencement of the vertical interval. This is in part due to the fact that the read/write head must first travel a short distance before it is removed from the track it is currently on and in part due to a delay between energization and actual movement intrinsic in the mechanical/electrical system which drives the access arm.

Accordingly, to insure movement of the read/write head across a guard band only during the vertical interval, the track increment command must be generated at a precise amount of time prior to commencement of the vertical interval. To facilitate this result, controller 5 sends over increment line 54 an increment command to selectable anticipatory timer 15 upon detection of the sync pulse immediately preceding the vertical interval during which a track increment is to be made. Selectable anticipatory timer 15 is pre-adjusted to delay this increment command signal from increment line 54 just enough time so that when the signal is issued to the step motor 17 by driver 16 the read/write head will pass through the guard band during the next vertical interval.

As explained above, applicant has in the past used this anticipatory system with some success. Applicant has discovered, however, that usage of a single anticipatory timer circuit will not always provide track incrementation without tearing of the picture. The reason appears to be attributable to the fact that the mechanical and electrical delays intrinsic in the access arm positioning system are not equal during both forward and reverse track incrementing. Accordingly, applicant's invention eliminates this problem by providing an anticipatory time for forward incrementing which is different than the anticipatory time for backward incrementing.

FIG. 1 illustrates a preferred embodiment of the components necessary to provide these two anticipatory times. As previously indicated, the increment command signal comes over increment line 54 and to selectable anticipatory timer 15. The amount of delay which the increment command signal will be delayed by selectable anticipatory timer 15 will depend upon the setting of forward/reverse selector 14. Selectable anticipatory timer is designed such that the amount of delay in the forward direction can be separately adjusted from the amount of delay in the reverse direction. In this way, tearing of the picture due to unequal movement times is eliminated.

It is noted that selectable anticipatory timer 15 has two output lines 151 and 152. As is common in step motor driver systems, line 151 functions as the forward command line while line 152 functions as a reverse command line. Driver 16 then interfaces these commands to provide the necessary driving power to the step motor via connection lines 161-164.

Having defined the components of a preferred embodiment of applicant's invention, the tremendous flexibility which such a system offers will now be examined.

In the record mode, the system can be set up to record a series of frames on different tracks. The system can be designed such that the timing between sequentially recorded pictures is manually controlled by separate manual depressions of record button 3, or the system can be designed such that by merely depressing record button 3, a series of pictures will be automatically taken, separated by an amount of time determined by the setting of speed control 7.

In some applications, it will not be necessary to store each newly recorded frame on a separate track. In this mode of operation, the access arm remains stationary while the newly photographed frames are written over the previously recorded frame. Between writing intervals, of course, controller 5 will cause disc storage unit 12 to continually playback the single recorded frame on the video monitor connected to video output line 121. In this mode of operation, the functions of the standard fluoroscope are most nearly duplicated.

It is also possible to record a sequence of video frames and then to play them back at a different rate. This mode is most useful in quickly reviewing the history of rather slow changing picture information.

While it is, of course, wholly within the grasp of one of ordinary skill in the art to which applicant's invention pertains to install sufficient panel controls to enable the system to operate in all of the modes described above as well as in other desirable modes not mentioned, such a broad scope of operational modes is rarely required by any single end user. Accordingly, the additional expense of making each unit capable of operating in all modes is not warranted nor is the complexity of panel controls desired.

On the other hand, each different mode of operation will be of value to some end user. Accordingly, applicant has designed his system such that by physically changing certain internal components, the different modes of operation can easily be realized using the same panel controls which, in certain cases, need merely be relabeled.

To effectuate this result, controller 5 is itself controlled by mode command generator 4. Mode command generator 4 provides to controller 5 through line 40 (which is actually representative of many electrical interconnections) the necessary signals to enable controller 5 to operate in the desired mode. Thus, for example, where automatic recording of repetitive frames is not required, mode command generator 4 will provide the appropriate signals to controller 5 so that only a single frame will be recorded each time record button 3 is depressed. The remaining portions of the system are, of course, necessary to insure the recording and play back of frames without tearing. The design of controller 5 is such that virtually any desired mode of operation can be achieved merely by inserting the appropriate mode command generator 4.

Although specific details of the components of applicant's system have not been shown, their construction is well within the skill of those familiar with video recorder controllers. To a certain extent, the structure of controller 5 and mode command generator 4 is dependent upon the desired flexibility of the system.

Applicant does, however, contemplate that controller 5 and mode command generator 4 be implemented in either hardware or software or a combination of both. For example, controller 5 can be any of the well-known types of microprocessors while mode command generator 4 can be one of a number of types of read-only memories. With this latter design choice, the operational modes of applicant's system can be easily yet effectively changed merely by inserting a different read-only memory. It is also contemplated that many of the other elements of applicant's invention can be implemented in software as well as hardware, such as selectable anticipatory timer 15, variable counter 6, and the phase energization selector portion of driver 16. Sync selector 9 can also be implemented in software by stripping both the input and output video sync signals before they are fed to the sync selector.

We claim:

1. A video recorder controller comprising:
   (a) controller means for generating a track increment command signal;
   (b) driver means for driving a read/write transducer a pre-determined distance in a forward direction upon receipt of a forward command signal and for driving the read/write transducer a pre-determined distance in a reverse direction upon receipt of a reverse command signal; and
   (c) anticipatory timer means for delivering to said driver means said forward command signal a first pre-determined amount of time after receipt of said track increment command signal when a forward track increment is to be made, and for delivering to said driver means said reverse command signal a second pre-determined amount of time after receipt of said track increment command signal when a reverse track increment is to be made, said first and said second pre-determined amounts of times being independent.

2. The apparatus of claim 1 further comprising mode command generator means connected to said controller means for controlling the manner, sequence or timing in which said controller means generates said track increment command signal.

3. The apparatus of claim 2 wherein said mode command generator means includes a read-only memory.

4. A controller for a video recorder comprising:
   (a) counter means for counting video pictures and for providing an output signal after a pre-determined number of video pictures are received;
   (b) controller means connected to said counter means for causing one of the video pictures to transfer to or from said memory recorder after detection of said output signal, and for generating a track increment command signal;
   (c) driver means for driving a read/write transducer a pre-determined distance in a forward direction upon receipt of a forward command signal and for driving said read-write transducer a pre-determined distance in a reverse direction upon receipt of a reverse command signal;
   (d) anticipatory timer means for delivering to said driver means said forward command signal a first pre-determined amount of time after receipt of said track increment command signal when a forward track increment is to be made, and for delivering to said driver means said reverse command signal a second pre-determined amount of time after receipt of said track increment command signal when a reverse track increment is to be made, said first and said second pre-determined amounts of times being independent; and
   (e) directional means for commanding whether a track increment is to be in a forward or a reverse direction.

5. The apparatus of claim 4 further comprising mode command generator means connected to said controller means for controlling the manner, sequence, or timing in which said controller means causes transference of the video pictures to or from the memory of a video storage unit and for controlling the manner, sequence or timing in which said controller means generates a said track increment command signal.

6. The apparatus of claim 5 wherein said mode command generator means includes a read-only memory.

7. A method of controlling a video recorder comprising the steps of:
   (a) generating a track increment command signal;
   (b) delivering to a driver means a forward command signal a first pre-determined amount of time after receipt of said track increment command signal when a forward track increment is to be made, or delivering to said driver means a reverse command signal a second pre-determined amount of time after receipt of said track increment command signal when a reverse track increment is to be made, said first and said second pre-determined amounts of times being independent; and
   (c) driving a read/write transducer a pre-determined distance in a forward direction upon receipt of the forward command signal or driving the read/write transducer a pre-determined distance in a reverse direction upon receipt of the reverse command signal.

8. A method of controlling video recorder comprising the steps of:
   (a) counting video pictures and providing an output signal after having counted a pre-determined number of video pictures;
   (b) transferring one of the video pictures to or from the memory of a video storage unit after detection of said output signal, and generating a track increment command signal;
   (c) delivering to a driver means a forward command signal a first pre-determined amount of time after receipt of said track increment command signal when a forward track increment is to be made, or delivering to said driver means a reverse command signal a second pre-determined amount of time after receipt of said track increment command signal when a reverse track increment is to be made, said first and said second pre-determined amounts of times being independent; and
   (d) driving a read/write transducer a pre-determined distance in a forward direction upon receipt of a forward command signal and for driving said read/write transducer a pre-determined distance in a reverse direction upon receipt of a reverse command signal.

* * * * *